Patented July 29, 1941

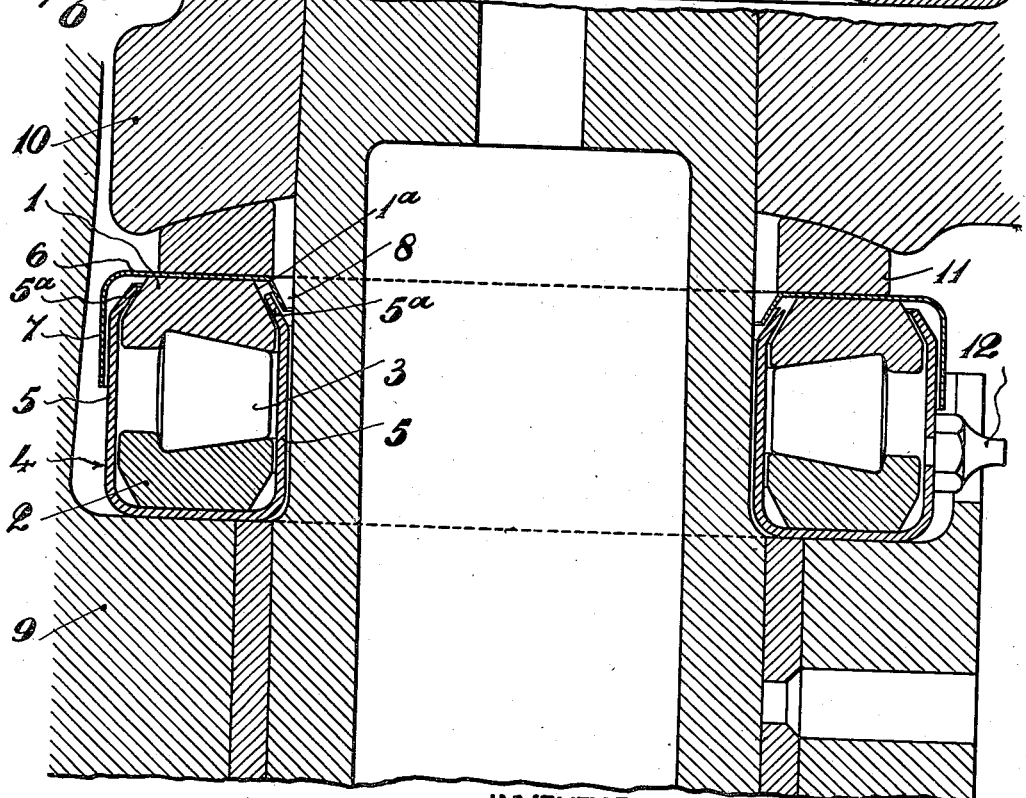

2,250,668

UNITED STATES PATENT OFFICE 2,250,668

THRUST BEARING

Arthur William Hill, Birmingham, England, assignor to The Timken Roller Bearing Company, Canton, Ohio, a corporation of Ohio Application April 20, 1940, Serial No. 330,709
In Great Britain July 21, 1939

1 Claim. (Cl. 308—231)

This invention relates to thrust bearings either of the plain or anti-friction type, the bearings, in the latter case, comprising either balls or rollers interposed between race members.

The principal object of the present invention is to provide a thrust bearing which is effectively protected against the ingress of water, dirt, dust and the like to the bearing or working surfaces, thus preventing corrosion and undue wear of such surfaces, and to protect the lubricant with which the bearing and its casing are filled from contamination by water, dirt and the like. The invention is thus particularly applicable to thrust bearings which are located in positions where they are liable to be exposed to water, dust, dirt and the like.

A further object is to provide for the retention of the lubricant with which the bearing and its casing are filled, so that replenishments are not required except after long intervals of time.

According to the invention, the component elements of a thrust bearing are enclosed or contained within an annular channel-shaped casing or enclosure device the walls of which extend in an axial direction over the inner and outer circumferential surfaces of the annular bearing members. The outer edges of the walls of the casing may be closed in over the outer or top bearing element so as to make the entire bearing a self-contained unit, whilst the top of the casing may be closed by a separate external cover ring.

Figure 1 of the accompanying drawings represents a vertical section through a casing constructed in accordance with this invention for housing the elements of a thrust bearing, the casing being shown before the bearing elements have been fitted in place, and before the edges of the side walls of the casing have been closed in.

Figure 2 shows the elements of the thrust bearing fitted within the casing, with the edges of the latter closed in over the top race, and with a cover applied over the top of the casing.

Figure 3 illustrates the application of the combined thrust bearing and casing to a vehicle steering pivot.

Figure 4:
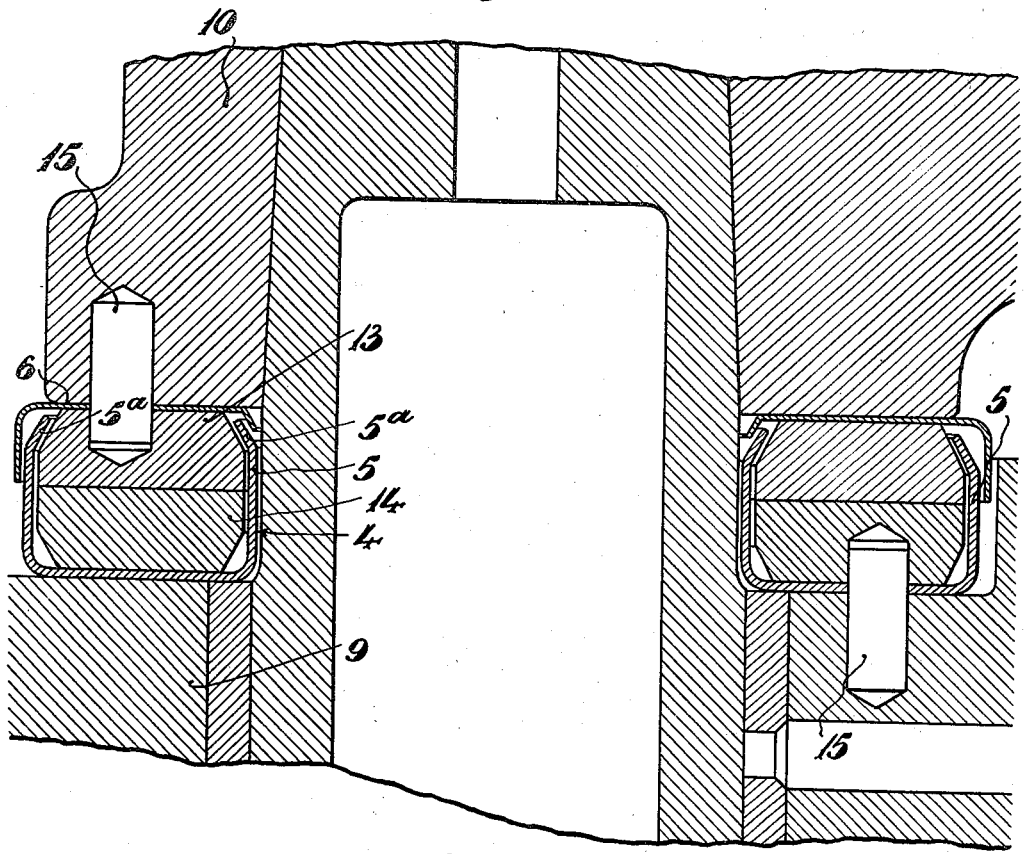
Figure 4 is a sectional view showing how the invention may be applied to a plain bearing.

Referring to Figures 1 to 3 of the drawings, the several elements of a vertical thrust bearing, comprising upper and lower annular race rings 1 and 2, separated by tapered anti-friction rollers 3, are housed, according to the invention, within an annular sheet metal casing or shell 4 of channel section, with a flat radially disposed bottom, and concentric axially-disposed circumferential side walls 5. The top of this casing 4 is initially open and the upper edges of the side walls 5 may be slightly tapered, if desired, at 5ᵃ as shown in Figure 1, these tapering edges being adapted to be subsequently closed over the bevelled or chamfered annular face 1ᵃ of the top race ring 1.

The side walls 5 are integral with the bottom of the casing 4, the latter being lubricant retaining, and in assembling the bearing elements within the casing, the lower race ring 2 is first arranged to rest upon the bottom of the said casing and the anti-friction rollers 3 are inserted. The top race ring 1 is then introduced into this casing so as to rest on the rollers, the top surface of the upper race 1 projecting slightly above the upper edges of the side walls 5, which extend around the circumferential surfaces of both race members as shown. Lubricant is introduced into the casing 4 so that the latter is completely filled, and after the parts of the bearing have been assembled within the casing, the upper edges of the walls 5 are slightly closed in to overhang the chamfered or bevelled faces 1ᵃ of the upper race ring so that all the bearing elements are thus held together and a self-contained unit assembly is formed. The width of the channel-sectioned casing 4 is slightly greater than the width of the race rings 1 and 2, so that small clearances are left at opposite sides of said rings. Small clearances are also left between the inturned edges 5ᵃ of the casing and the opposed bevelled surfaces 1ᵃ of the top race. The top of the casing 4 is closed by a separate loose cover ring 6 comprising a flat radial part which rests upon the top of the upper race member 1, and integral turned down annular flanges 7 and 8, the flange 7 being deeper than the other flange and depending vertically so that it surrounds, and is spaced slightly from, the outer wall 5 of the casing. The other flange 8 may be bent at an angle of 45 degrees, and is arranged, as shown, to overlap the bent-in upper edge of the inner wall 5 of the casing, from which it is separated by a slight clearance.

The bearing in the casing 4 and with the cover 6 in position, is mounted as a unit where required, with the bottom of the channel supported upon an abutment or collar, such as upon the part 9 of the steering pivot shown in Figure 3 of the drawings, the part 10 of the pivot being supported, through the ring 11 and the cover 6 of the casing, upon the top race member. The outer wall 5 of the casing 4 may be fitted, as shown in this figure, with a grease nipple 12 through which lubricant may be introduced in order to replenish the supply when necessary.

The bearing assembly, with the casing and cover, may be mounted in any suitable manner, according to the purpose for which it is required, either the cover ring 6 or the body 4 of the casing remaining stationary whilst the other part rotates with the bearing member which is in contact with it. As the sides of the bearing are covered by the side walls 5 of the casing, and the top of the latter is closed by the cover, the entrance of water, dirt dust and the like to the working surfaces of the bearing and to the lubricant is effectively prevented.

In the case of the plain thrust bearing shown in Figure 4 of the drawings, the two bearing rings 13 and 14 are enclosed in a channel-sectioned casing 4 and the upper edges 5ᵃ of the sides 5 of the casing are bent in over the chamfered edges of the top bearing ring 13 in the same way, the sides of the casing being shorter. A cover 6 of the construction previously described may also be provided. The bearing rings 13 and 14, with the casing 4 and cover 6, are fitted between the relatively movable parts 9 and 10 of the steering pivot illustrated, and the respective bearing rings may be prevented from turning relatively to the adjacent parts 9 or 10 by pins 15 passing through either the bottom of the casing 4 or through the cover 6, as shown.

Figure 5:
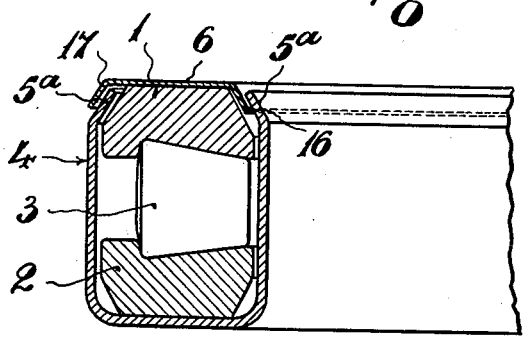
Figure 5 illustrates a slightly modified arrangement.

In the modified arrangement illustrated in Figure 5 of the drawings the casing 4, which is shown enclosing the race rings 1 and 2 and taper rollers 3, is of precisely the same construction above described, but the cover 6 is connected to the casing to form a self-contained part of the unit assembly. Thus, both edges of the said cover 6, which rests on the top race ring, are bent down at equal angles into narrow flanges 16 and 17, and the flange 16 at the inner edge is arranged to lie over the chamfered inner edge of the top race ring, whilst the edge 5ᵃ of the inner wall of the casing is closed in over the said flange 16 of the cover, thereby holding the latter in place. The edge 5ᵃ of the outer wall of the casing, on the other hand, is closed over the outer chamfered edge of the top race and the edge 17 of the cover overlaps this outer edge of the casing, as shown. If desired the outer flange 17 of the cover may be extended downwards and shaped in the same way as the outer flange 7 in the construction illustrated in Figure 2.

Figure 6:
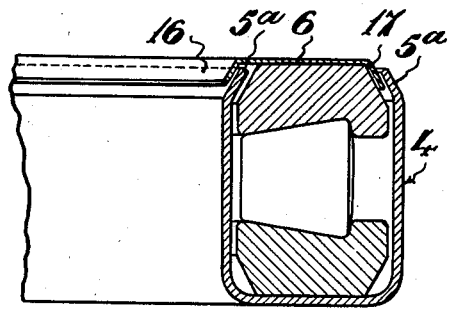
Figure 6 shows a further modification.

In the modification which is shown in Figure 6, the cover 6 is of the same shape as in Figure 5, but in this arrangement the outer edge 5ᵃ of the casing 4 is turned over the bent-down outer edge 17 of the cover, so as to hold the latter in place, whilst the inner edge 16 of the cover overlaps the inner edge 5ᵃ of the casing.

I claim:

A self-contained thrust bearing comprising co-operating bearing elements, an annular lubricant-retaining trough-sectioned casing containing the bearing elements and having concentric side walls disposed in the axial direction of the bearing, the outer edges of the said side walls of the casing being closed in over one of the bearing elements, and a flanged ring-shaped cover over the mouth of the casing.

ARTHUR WILLIAM HILL.